United States Patent
Wang

(10) Patent No.: US 6,488,072 B1
(45) Date of Patent: Dec. 3, 2002

(54) DUST COVER CAPABLE OF SIMULTANEOUS MOVEMENT IN PARALLEL MANNER

(76) Inventor: Greg Wang, No. 25, Kung Yeh 39 Rd., Hsi Tun Zone, Taichung (TW)

( * ) Notice: Subject to any disclaimer, the term of this patent is extended or adjusted under 35 U.S.C. 154(b) by 0 days.

(21) Appl. No.: 09/881,756

(22) Filed: Jun. 18, 2001

(51) Int. Cl.[7] .................................................. E06B 3/12
(52) U.S. Cl. ..................................................... 160/222
(58) Field of Search ................................ 160/222, 202, 160/211, 216, 223; 384/15, 16; 409/134

(56) References Cited

U.S. PATENT DOCUMENTS

| | | | | |
|---|---|---|---|---|
| 1,832,966 A | * | 11/1931 | Cook et al. | 160/202 |
| 3,260,303 A | * | 7/1966 | Pipe | 160/202 |
| 3,565,153 A | * | 2/1971 | Loos | 160/222 X |
| 4,039,021 A | * | 8/1977 | Moritz et al. | 160/202 |
| 5,169,223 A | * | 12/1992 | Suzuki et al. | 160/202 X |
| 5,560,415 A | * | 10/1996 | Geissler | 160/222 X |

* cited by examiner

*Primary Examiner*—David M. Purol
(74) *Attorney, Agent, or Firm*—Browdy and Neimark, P.L.L.C.

(57) ABSTRACT

A dust cover comprises a plurality of shied plates which are equal in shape and progressively reduced in size. The shield plates are joined together such that they expand and retract along an axial direction; a linking device formed of a plurality of link rod units which have two rod members equal in length. The two rod members are pivoted together at the midpoint such that two ends of the two rod members form a pair of opening-closing arms. Two arms of each one end of each link rod unit are pivoted with two arms of other link rod unit to form two pivoting points pivoted in the lower side of the same shield plate.

11 Claims, 5 Drawing Sheets

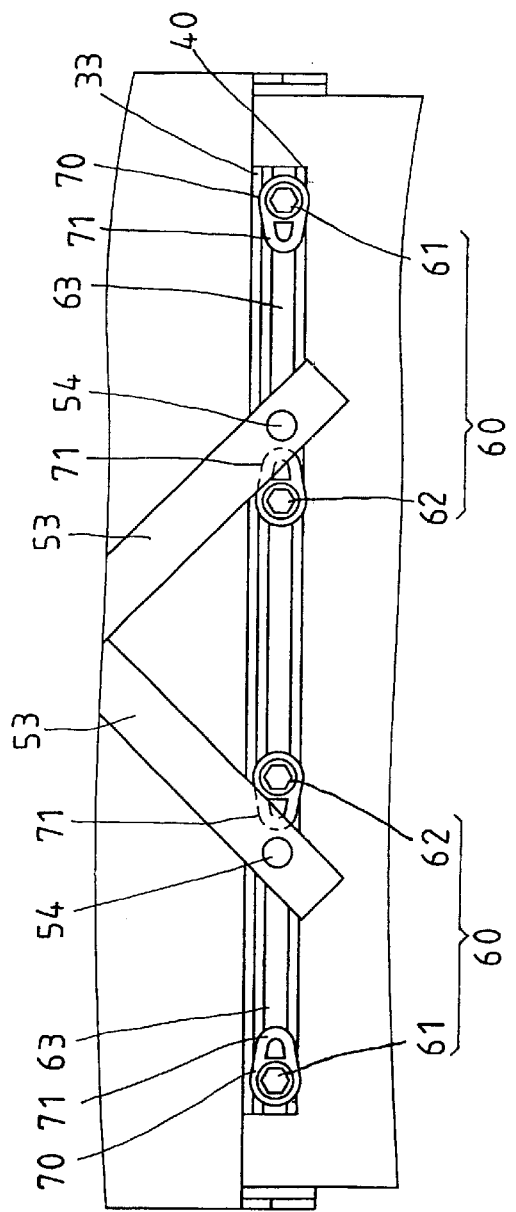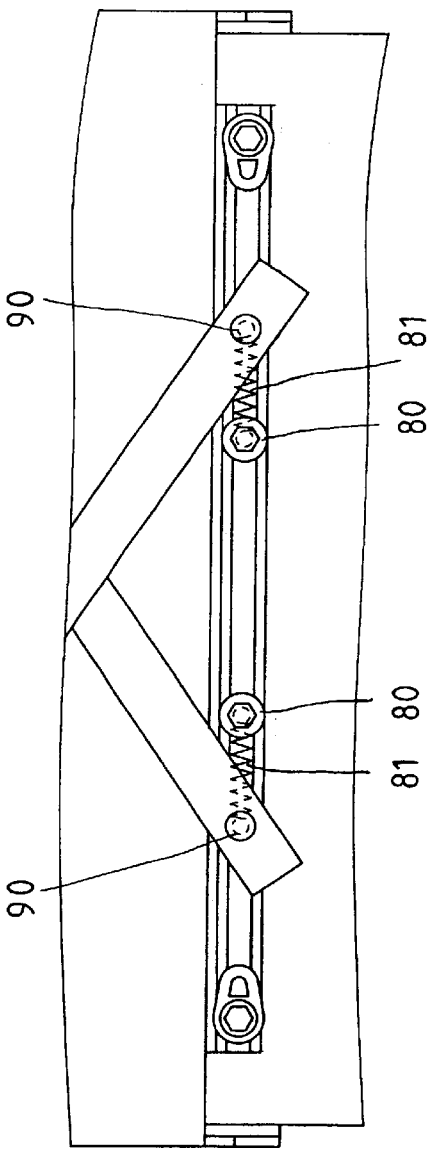

DUST COVER CAPABLE OF SIMULTANEOUS MOVEMENT IN PARALLEL MANNER

FIELD OF THE INVENTION

The present invention relates to a dust cover.

BACKGROUND OF THE INVENTION

As shown in FIG. 1, a prior art dust cover 10 is formed of a plurality of shield plates similar in shape and different in size such that they are progressively smaller. The shield plates are joined together such that they are moved one after another, with the first shield plate acting like a locomotive. The dust cover can be thus expanded or retracted.

The prior art dust cover has several shortcomings. In the first place, the prior art dust cover is noisy in view of the fact that the shield plates collide with one another to make noise at the time when they are pulled one after another. In order to avert the noise, the shield plates are provided with a plastic silencer., which is vulnerable to damage caused by the engine oil, the rustproof machining fluid, the collision, etc. The damaged plastic silencer must be replaced every three months. In light of the pulling of the shield plates one after another, the dust covers are apt to be unparalleled. As a result, the dust covers are eventually moved in a curved path, thereby resulting in damage of the dust covers.

SUMMARY OF THE INVENTION

The primary objective of the present invention is to provide a dust cover which is quiet and capable of moving simultaneously in a parallel manner.

The dust cover of the present invention comprises a plurality of shield plates which are equal in shape to one another, and different in size such that the size is progressively reduced. The shield plates are joined together to expand or retract axially. The dust cover further comprises a linking device which is formed of a plurality of link rod units, with each having two rod members equal in length. The two rod members are pivoted together at the midpoints thereof such that two ends of the two rod members form a pair of arms capable of opening and closing. The two arms of each side of each link rod are pivoted with the two arms of other link rod to form two pivoting points, which are pivoted under the same shield plate, thereby forming an expandable and retractable device for linking the dust cover.

BRIEF DESCRIPTION OF THE DRAWINGS

FIG. 4 shows an enlarged partial schematic view of the slide slot and the link rod unit of the present invention.

FIG. 5 is same as FIG. 4 to show the second preferred embodiment of the present invention.

DETAILED DESCRIPTION OF THE INVENTION

Figure 1:
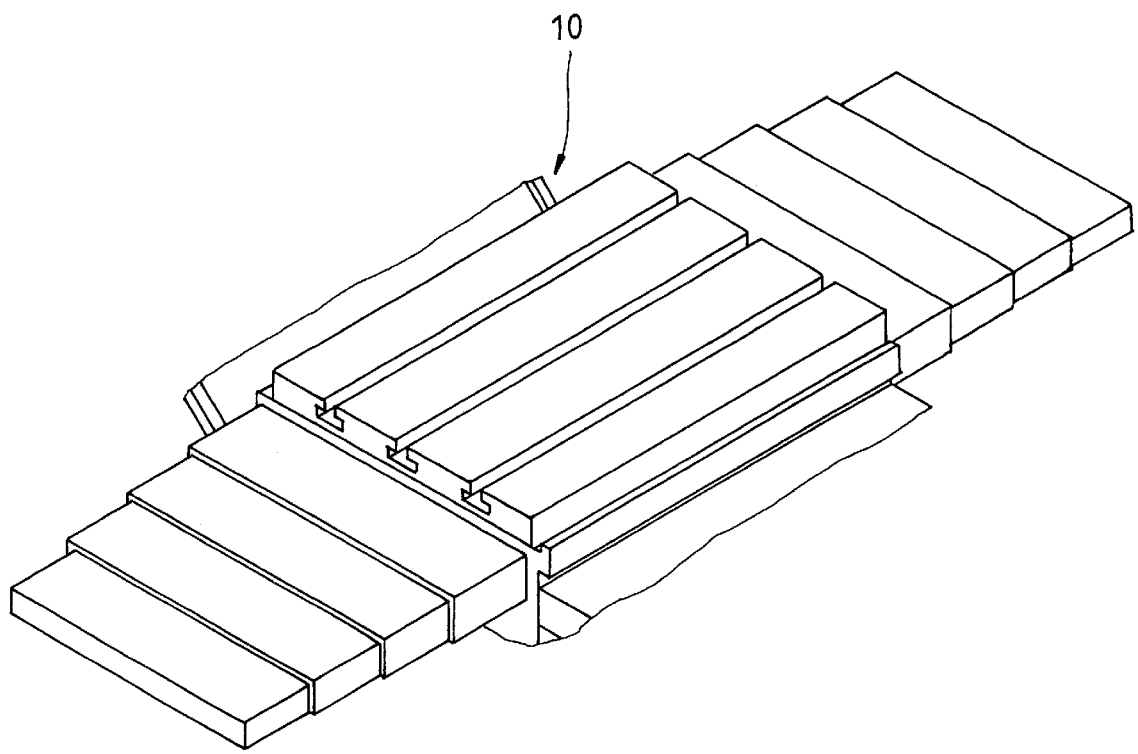
FIG. 1 shows a perspective view of a prior art dust cover.
Figure 2:
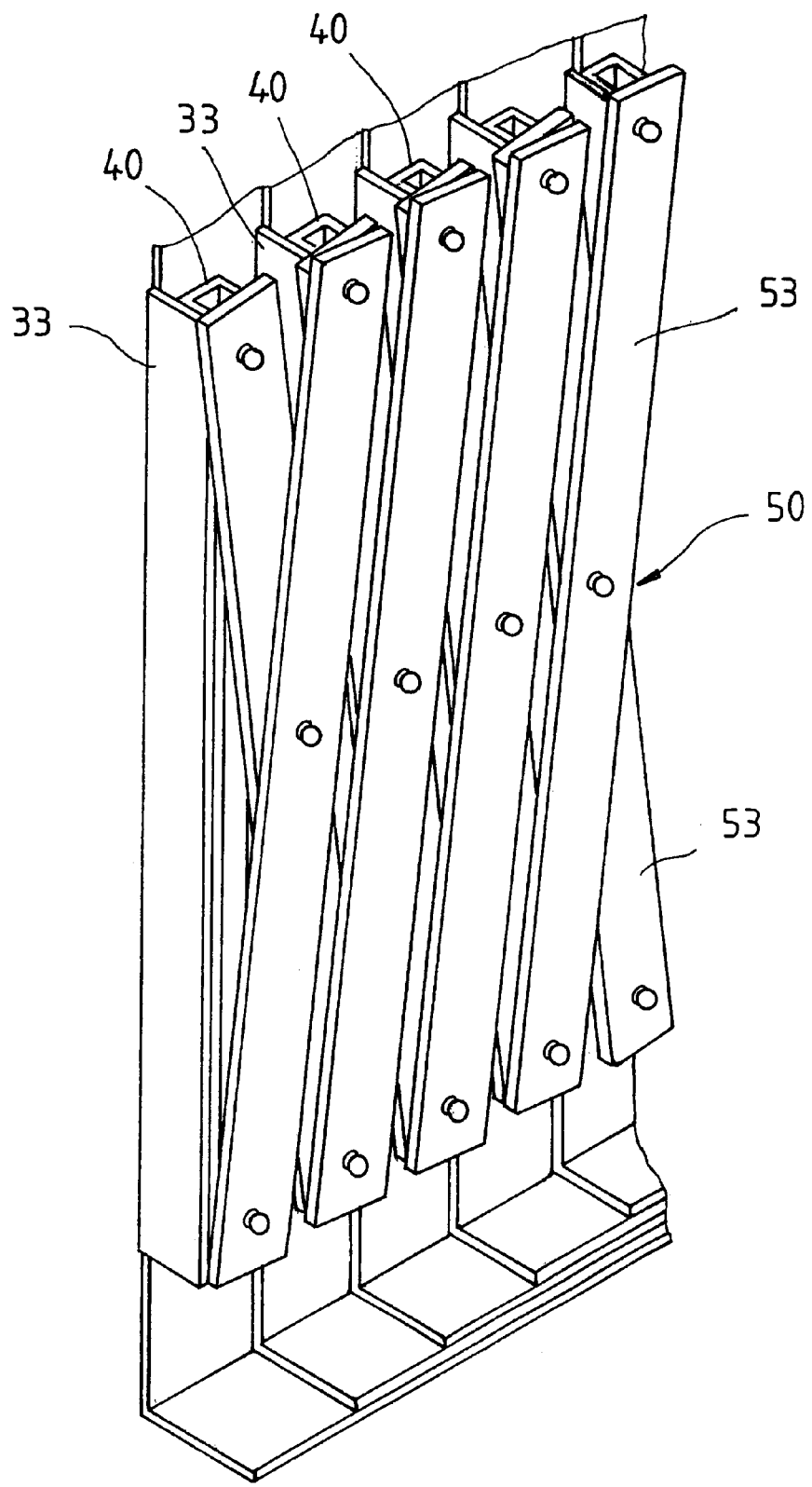
FIG. 2 shows an external perspective view of portion of the linking device of the present invention.
Figure 3:
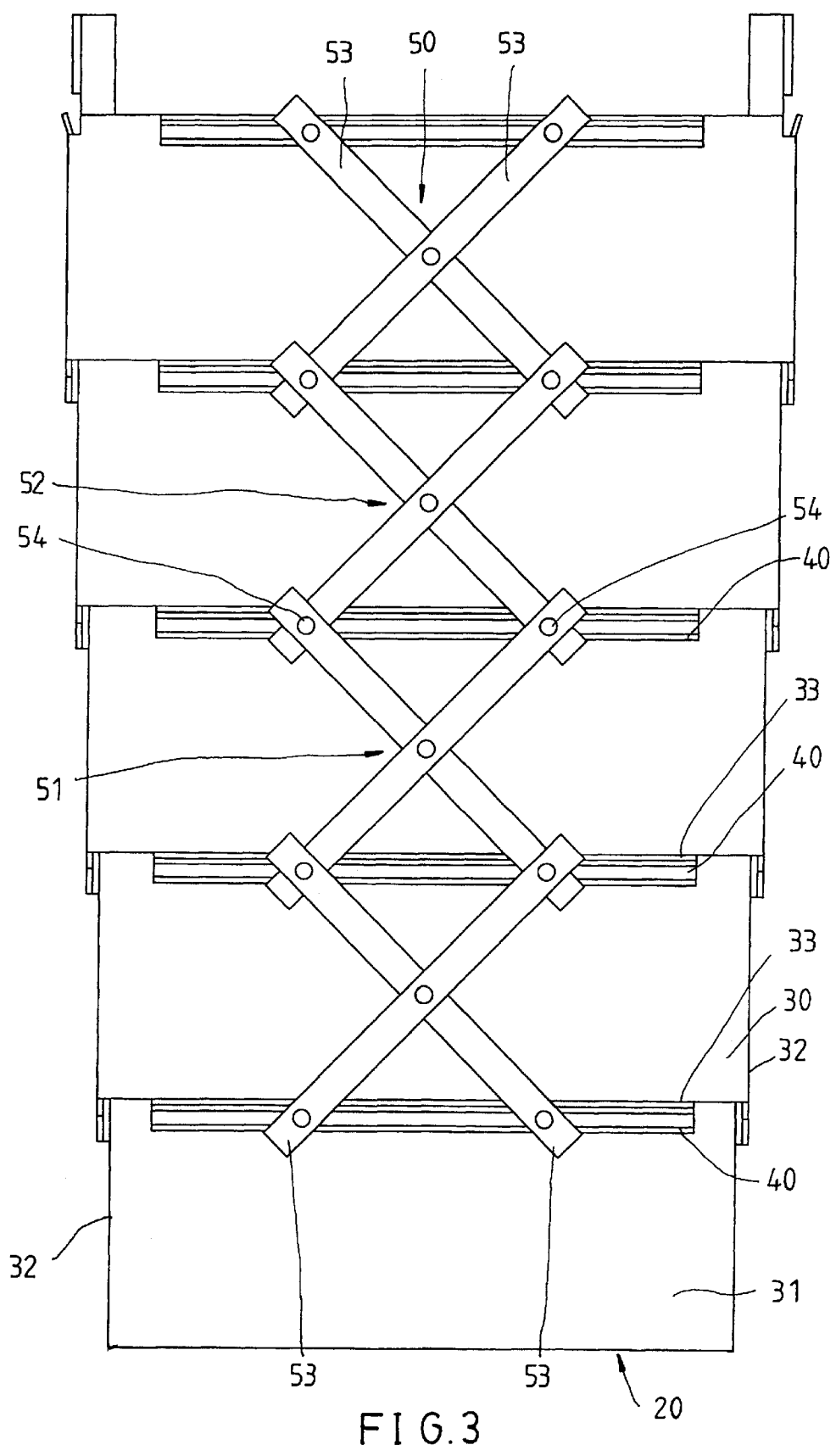
FIG. 3 shows a bottom view of the present invention.

As shown in FIGS. 2–6, a dust cover 20 of the present invention comprises the following components.

A plurality of shield plates 30 which are equal in shape and progressively smaller in size, and are orderly joined together. The number of shield plates depends on the actual operational requirement. This embodiment contains five shield plates which are joined together to expand or retract along an axial direction. Each shield plate has a top portion 31, two side wall portions 32, and a back plate portion 33, which are same as the prior art structures.

Each shield plate 30 is further provided with:

A slide slot 40 is a long slot perpendicular to the axial direction of expansion and retraction and is disposed in the bottom edge of the back plate portion 33.

A linking device 50 is formed of a plurality of link rod units equal in number to the shield plates. The lowest link rod unit 51 and the link rod unit 52 of the drawings are described hereinafter. The rest is the same and will not be described. Each link rod unit is formed of two rod members 53 equal in length. The two rod members are pivoted together at the midpoint, thereby making two ends thereof an X-shaped structure capable of opening and closing on the pivoting point. The opening-closing arm of one end of the link rod unit 51 is pivoted with the opening-closing arm of one end of other link rod unit 52. The two pivoting places are provided with an insertion bolt 54 to form an expandable and retractable structure. These two insertion bolts 54 are disposed in the slide slot 40 of the same shield plate 30 to slide along the longitudinal direction of the slide slot. They are so continuously pivoted to form a linkable dust cover capable of expanding and retracting.

Two stop member sets 60 each comprises two stop members, which are two bolts, as shown in FIG. 4. One outer stop member set 61 is fastened with two ends of the slide slot (opposite outer side end of two insertion bolts 54 in the slide slot). Other inner stop member set 62 is fastened in the inside of the slide slot 40 (opposite inner side end of the two insertion bolts 54). The slide slot between the outer stop member and the inner stop member is formed as a moving area 63. When the linking device is retracting, each insertion bolt 54 slides outwards in the slide slot 40 to an outer stop point position. When the linking device is expanding, each insertion bolt slides inwards in the slide slot toward the inner stop member to an inner stop point position.

Four elastic members 70 of the embodiment are four plastic sleeves having an elasticity and are correspondingly fitted over the two stop member sets 60. Each elastic member is further provided with a collision proof protrusion 71 facing the interior of the corresponding moving area 63.

The dust cover 20 of the present invention expands by means of the opening-closing arm of each unit rod unit. The two insertion bolts 54 slide in the slide slot 40 toward the inner stop member set 62 to link shield plates 30 to expand simultaneously for same distance in a parallel manner, thereby bringing about the dust preventing action. In light of the shield plates 30 expanding and retracting at the same time for the same distance, the shield plates are prevented from colliding with each other to make noise. The present invention is thus devoid of a silencing block and is therefore cost-effective.

The dust cover 20 retracts by means of the opening-closing arm of each link rod unit such that the insertion bolts 54 slide in the slide slot 40 toward the outer stop member set 61, thereby actuating at the same time the shield plates 30 to bring about the retracting action of the dust cover 20. As a result, the present invention can prevent the problem of the dust cover moving in an unparalleled manner and in a curved path. In light of the simultaneous, equivalent and parallel movement of the shield plates, the shield plates are prevented from colliding with each other so as to attain the objective of the present invention.

As shown in FIG. 5, the second preferred embodiment of the present invention comprises an inner stop member set 80 which is provided with an elastic member 81. The elastic member 81 may be a spring, which is disposed at one end on the inner stop member 80 and at other end on the insertion bolt 90 of the link rod unit, thereby preventing the collision of the insertion bolt with the stop member and providing a position confining function. The linking device 50 is prevented from sliding aside so as to enable the dust cover to expand and retract smoothly in a parallel manner.

Figure 6:
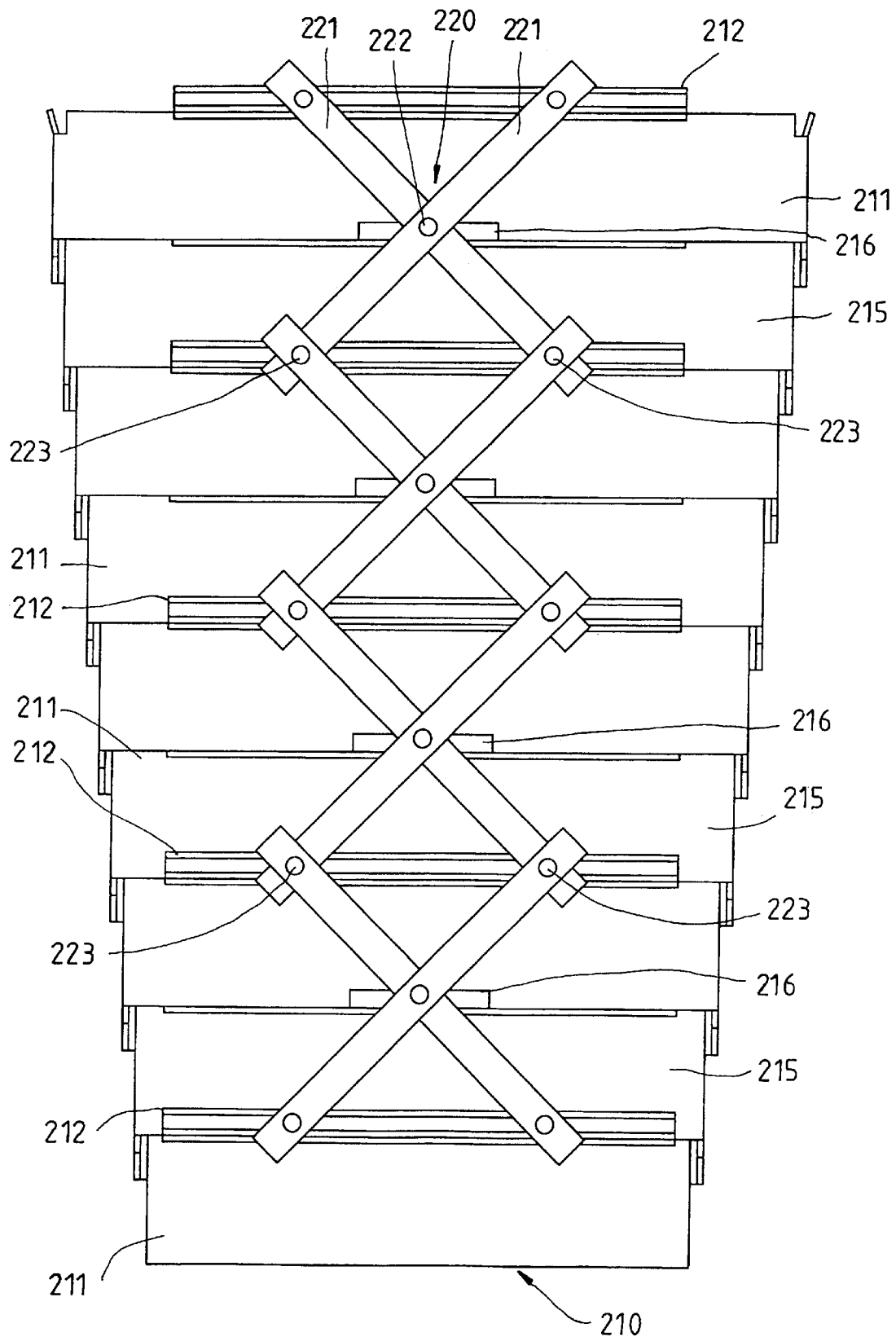
FIG. 6 is same as FIG. 3 to show a bottom view of the third preferred embodiment of the present invention.

As shown in FIG. 6, the third preferred embodiment of the present invention comprises one set of shield plates 210, a linking device 220 disposed in the lower portion of the shield plates to form a linking structure capable of expanding and retracting in the direction of the action of the dust cover. The third embodiment is same as the first embodiment, with the differences being that:

The pivoting place of two rod members 221 of the linking device link rod unit is further provided with a pivoting portion 222;

The shield plate set is arranged at intervals such that the first, the third, and the fifth shield plates are grouped as A set 211, and that the second, the fourth, and the sixth shield plates are grouped as B set 215. The bottom edge of the back plate of the lower side of each shield plate of the A set is provided with a slide slot 212, which is same as the first embodiment. The center of the bottom edge of the back plate of the lower side of each shield plate of the B set is provided with a pivoting seat 216. The slide slot and the pivoting seat are interchanged in the lower side of the dust cover.

The linking device 220 is assembled with the shield plates such that the insertion bolts 223 of the pivoting place of the link rod unit are respectively pivoted in the slide slot 212 of the lower side of the shield plate of the A set, and that the pivoting portion 222 of the pivoting place of the two rod members of each link rod unit is correspondingly pivoted on the pivoting seat 216 of the lower side of the shield plate of the B set.

What is claimed is:

1. A dust cover comprising a plurality of shield plates which are equal in shape and progressively reduced in size, said shield plates being joined together to expand and retract along an axial direction; a linking device formed of a plurality of link rod units which have two rod members equal in length, said two rod members being pivoted together at the midpoint thereof such that two ends of said two rod members form a pair of opening-closing arms, two arms together at the midpoint thereof such that two ends of said two rod members form a pair of opening-closing arms, two arms of each one end of each link rod unit being pivoted with two arms of other link rod unit to form two pivoting points pivoted in the lower side of the same shield plate, wherein said shield plates are provided in the underside with a slide slot perpendicular to the moving axial direction of the dust cover; wherein said two pivoting points are provided with an insertion bolt respectively, the two insertion bolts are correspondingly pivoted in said slide slot of the same shield plate, so as to enable said two pivoting points to slide in said slide slot.

2. The dust cover as defined in claim 1, wherein each said slide slot is provided in two outer side ends with a stop member to prevent said pivoting points to slip out of said slide slot.

3. the dust cover as defined in claim 2, wherein said stop member is provided with an elastic member to prevent said pivoting point from colliding with said stop member.

4. The dust cover as defined in claim 2, wherein said slide slot is provided in an inner stop point with a stop member.

5. The dust cover as defined in claim 4, wherein said stop member is provided with an elastic member to prevent said pivoting point from colliding with said stop member.

6. The dust cover as defined in claim 1, wherein said slide slots are provided in an inner side of an inner stop point with a stop member.

7. The dust cover as defined in claim 6, wherein said stop member is provided with an elastic member.

8. The dust cover as defined in claim 4, wherein said stop member and the corresponding pivoting point are provided therebetween with a spring.

9. The dust cover as defined in claim 6, wherein said stop member and the corresponding pivoting point are provided therebetween with a spring.

10. The dust cover as defined in claim 1, wherein said shield plates are grouped into an A set and a B set, said two pivoting points formed by two link rod units are provided with an insertion bolt respectively, said two insertion bolts are pivoted in the lower side of a shield plates of the A set, and the pivot at the midpoint of two rod members of each link rod unit is correspondingly pivoted to the lower side of a respective shield plate of the B set.

11. The dust cover as defined in claim 10, wherein: each shield plate of said A set is provided in the lower side with a slide slot; and each shield plate of said B set is provided in the lower side with a pivoting seat, said slide slot and said pivoting seat being arranged interchangeably in the lower sides of the shield plates, said linking device being assembled with said shield plates such that said two insertion bolts of the pivoting points formed by two link rod units are respectively pivoted in the slide slot of the lower side of one A set shield plate, and that the pivoting portion of the pivot at the midpoint of the two rod members of each link rod unit is correspondingly pivoted on the pivoting seat of the lower side of a respective B set shield plate.

\* \* \* \* \*